No. 701,608. Patented June 3, 1902.
A. PHILLIPS.
ELECTRIC CONTROLLER.
(Application filed Sept. 23, 1901.)
(No Model.) 2 Sheets—Sheet 1.
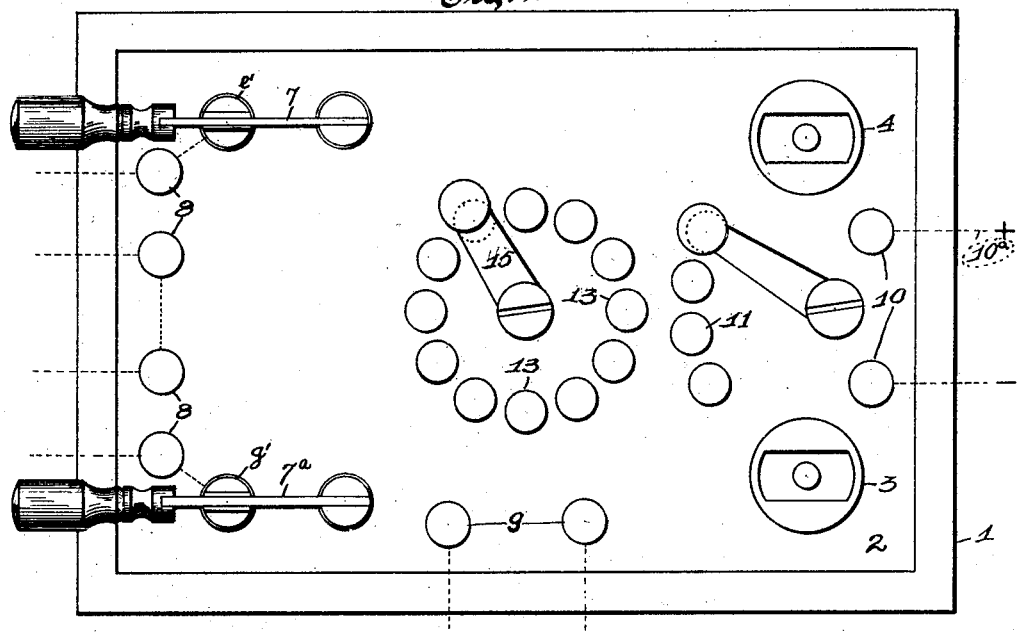
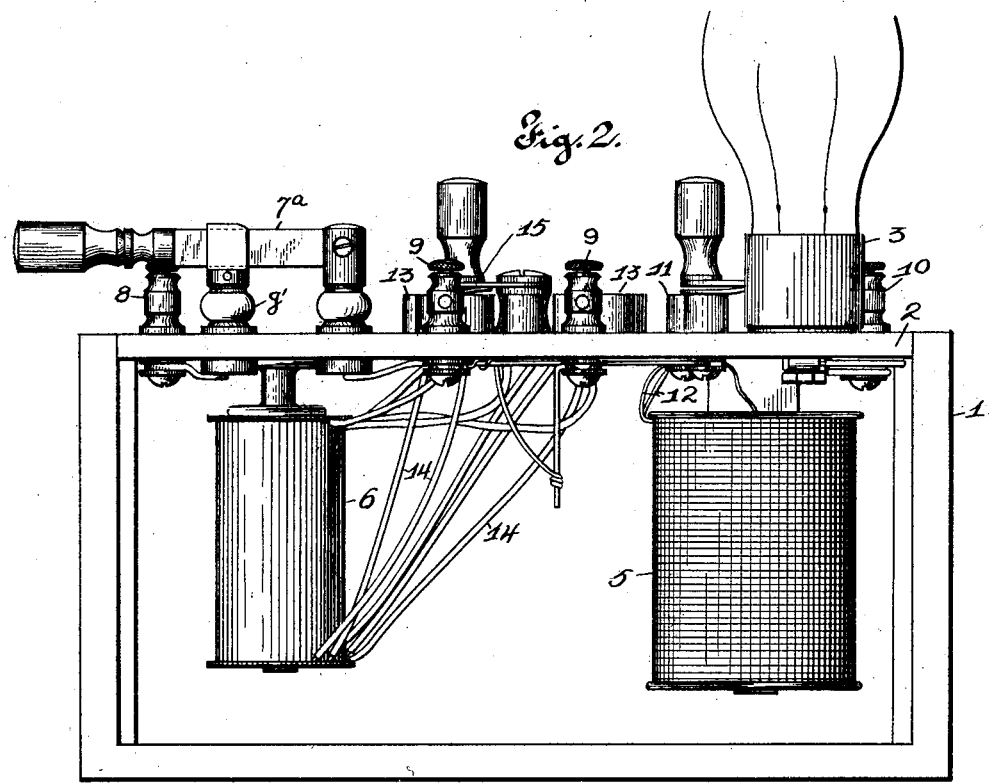

No. 701,608. Patented June 3, 1902.
A. PHILLIPS.
ELECTRIC CONTROLLER.
(Application filed Sept. 23, 1901.)
(No Model.) 2 Sheets—Sheet 2.
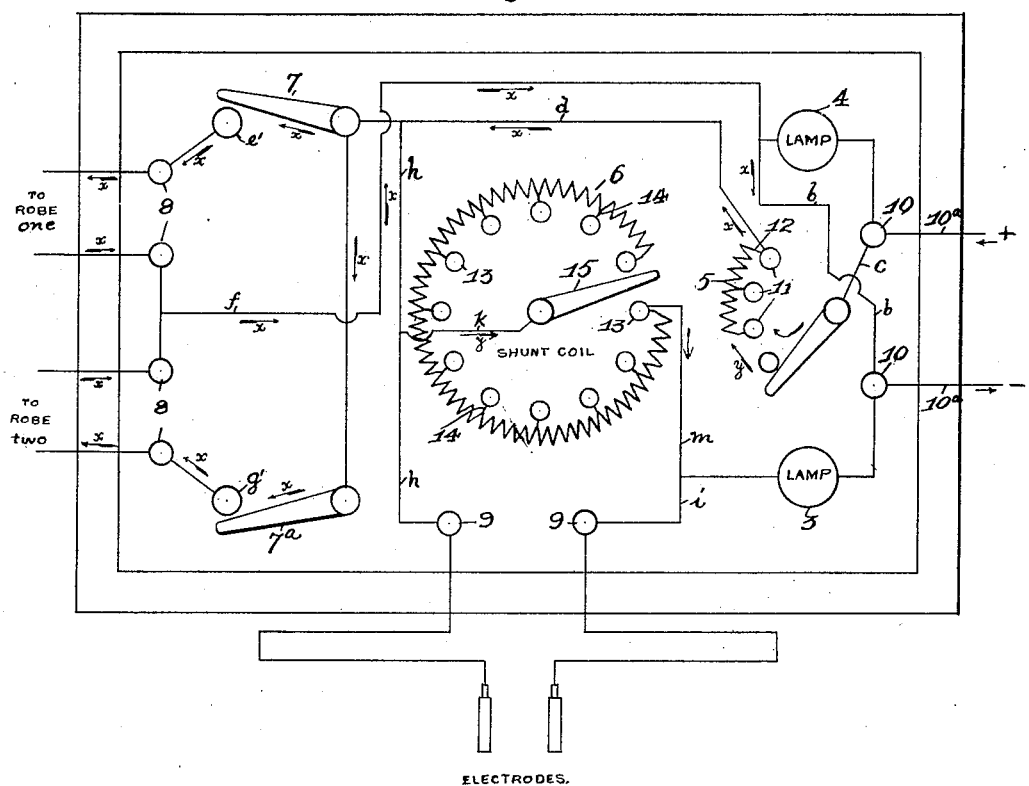
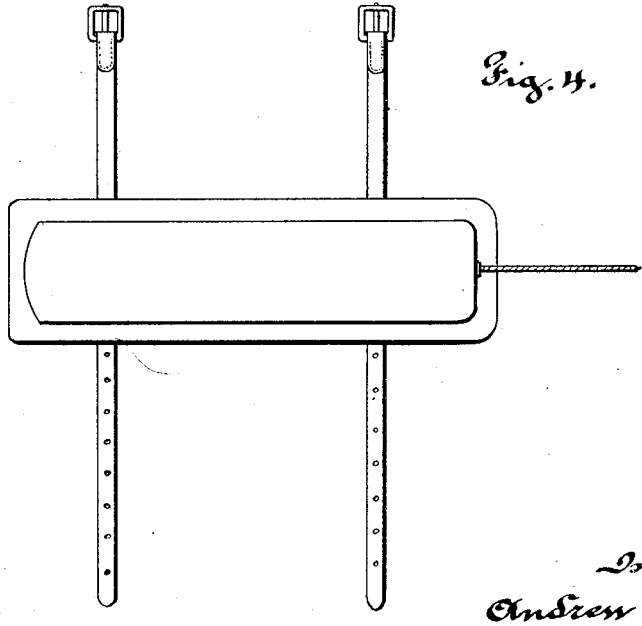

UNITED STATES PATENT OFFICE.

ANDREW PHILLIPS, OF ST. LOUIS, MISSOURI, ASSIGNOR, BY DIRECT AND MESNE ASSIGNMENTS, TO PITTSBURG ELECTRIC MACHINE COMPANY, OF PITTSBURG, PENNSYLVANIA, A CORPORATION OF PENNSYLVANIA.

ELECTRIC CONTROLLER.

SPECIFICATION forming part of Letters Patent No. 701,608, dated June 3, 1902.

Application filed September 23, 1901. Serial No. 76,278. (No model.)

*To all whom it may concern:*

Be it known that I, ANDREW PHILLIPS, of the city of St. Louis, State of Missouri, have invented certain new and useful Improvements in Electric Controllers, of which the following is a full, clear, and exact description, reference being had to the accompanying drawings, forming a part hereof.

This invention relates to improvements in controller-boxes; and it consists of the novel construction, combination, and arrangement of parts hereinafter shown, described, and claimed.

The object of this invention is to construct a controller-box to be used in connection with an electrical sweating-robe, (for which application for Letters Patent was filed by me September 23, 1901, Serial No. 76,279,) whereby one or two sweating-robes can be electrically heated independently or together.

A further object is to provide in combination with the means for heating the robes a means for shocking the patient, each capable of being used independently or together.

Another object of my invention is to provide improved connections whereby the apparatus can be attached to either alternating or direct circuits.

My invention consists of a suitable box or case, a cover for said box composed of insulating material, terminals for the sweating-robe circuits mounted upon said cover, switches for the sweating-robe circuits mounted upon said cover, terminals for the lines leading from the generator mounted upon said cover, two incandescent-lamp sockets mounted upon said cover, a rheostat for the sweating-robe circuit connected to said cover, a line running from one of the generator-terminals through the rheostat to one of the switches, a second line connecting the switches together, a return-wire for the sweating-robe circuit connected to the other generator-terminal, a line running from this return-wire through one of the lamps to the opposite terminal from that to which the return-wire is connected, binding-posts connected to said cover, electrodes connected to said binding-posts, a line connecting one of said binding-posts to the rheostat, a line running from the other binding-post through the second lamp to the opposite generator-terminal from that to which the rheostat is connected, a second rheostat, and a line running through said second rheostat and connected to the electrode-wires at points on the opposite sides of said binding-posts from the electrodes as required to partly short-circuit the electrodes.

Figure 1 is a top plan view of my invention, showing the connections by dotted lines in diagrammatic form. Fig. 2 is a side view with one of the side walls of the casing removed, showing its construction. Fig. 3 is a diagrammatic view of the circuit. Fig. 4 is a view of a shoe which is to be used on certain occasions in place of the electrode ordinarily held in the hand.

1 indicates a box or casing, in the upper part of which is supported a plate or cover 2, preferably composed of insulating material. To this plate is attached all the electrical connections.

3 and 4 are lamps, and 5 and 6 coils of wire used in connection with my invention, the function of which will be fully hereinafter set forth.

Upon the cover 2 are switches 7 and 7ª for the sweating-robe circuit.

8 indicates the binding-posts to which the connections of the robes are attached. 9 indicates the binding-posts to which the electrodes of the shocking-circuit are attached, and 10 indicates the binding-posts to which the wires 10ª from the main circuit are attached.

11 indicates a series of contacts to which are attached the various wires 12, leading from the coil 5, which is arranged as a rheostat.

13 indicates contacts to which are connected the wires 14, which lead from the other coil 6. Said wires 10ª are to be connected to an ordinary light-circuit, either direct or alternating, and the current will illuminate the lamp 4, passing over the wire *b*. The lamp is of such high resistance that it causes the current also to pass through the connection *c*, through the rheostat 5, over the wire $d$, and into the switches. When it is desired to use the controller and the connections have been made to one of the posts 10, the switches 7 and 7ª are opened and the rheostats 5 and 15 are opened. Then when the circuit is turned on the lamp 4 will burn brightly, the current passing through one of the lines 10ª to one of the posts 10, then through the lamp 4, then over the line $b$ to the other post 10, and over the other line 10ª. Now if the switch 7 is closed and the rheostat 5 is turned to engage one of the posts 11, then the circuit will pass from the wire 10ª through one of the posts 10, through the rheostat 5, through the switch 7 to one of the posts 8, then through the robe to the other post 8, then over the line $f$ to its junction with the lamp 4, then over the line $b$ to the other post 10. The strength of the lamp 4 will be diminished by the amount of current which passes through the rheostat 5 and the robe $l$, and this amount of current may be increased or diminished as desired by operating the rheostat. Should it be desired to charge one robe, the switch 7 is thrown to contact $e'$ and the current will pass through the robe (not shown) and then out by means of the wire $f$. If it is desired to charge the second robe, the switch 7ª is placed to contact $g'$ and the current will pass through the second robe and also out by way of the wire $f$. By means of the said switches both of the robes can be used simultaneously or separately. During this operation the lamp 3 does not burn at all, because the rheostat 15 is open and the electrodes are separated and no current can pass through the lamp 3.

To use the shocking-current, the lever 15 is manipulated, bringing it in contact with the contact-points 13 of the shunt-coil 6, thereby allowing the current to pass through the rheostat 5, over the wire $d$ and into the wire $h$ through the object to be charged, and back by means of the wire $i$ and through the lamp 3. To the wire $h$ is attached a wire $k$, which communicates with the lever 15, and the wire $m$ extends to one of the contact-points of the said shunt-coil. The current for supplying the robes will flow in the direction as indicated by the arrows $x$, and the direction of the current for supplying the shunt-coil is indicated by the arrows $y$.

When it is desired to use the electrodes, the rheostat 15 is operated to engage one of the posts 13, and the electrodes are engaged by the person to form the connection between said electrodes. Then a part of the circuit will pass through the shunt-coil and a part will pass through the electrodes and the lamp 3 will burn, and the strength of the current may be determined by the brilliancy of the lamp. In this operation the electric current passes over the line 10ª to one of the posts 10, then through the line $c$ to the rheostat 5, then over the line $d$ to its junction with the line $h$, then over the line $h$ to one of the posts 9, then through the electrodes to the other post 9, then over the line $i$ to the lamp 3. When the rheostat 15 is closed, part of the circuit passes from the line $h$ over the line $k$, through the rheostat 15, then over the line $m$ and the line $i$ to the lamp 3. The brilliancy of the lamp 3 indicates the amount of current passing through the rheostat 15 and the electrodes, and the position of the rheostat 15 indicates the proportion of said current that passes through said rheostat. When the rheostat 15 is turned on to send the circuit through the entire coil and the electrodes are not connected, the resistance of the rheostat is so great that the lamp 3 will not burn. Then if the electrodes are connected the lamp will burn, and its brilliancy will indicate the amount of current passing through the electrodes.

When the device is attached to a direct current, the shocking system will produce a galvanic effect, the same as a current produced by a voltaic battery. When it is attached to an alternating current, it will produce a faradic effect, whereby brief but intense currents are induced in alternating directions by the automatic making and breaking of the primary current.

In Fig. 4 I show an electric shoe adapted to be used in cases in which a patient may be unable to hold one of the hand-electrodes. This shoe may be applied to the foot by means of straps or other fastening attachments, and any other person may hold the other electrode and complete the circuit with the person wearing the shoe.

I claim—

1. A device of the class described, comprising a suitable box or case; a cover for said box composed of insulating material; terminals for the sweating-robe circuits mounted upon said cover; switches for the sweating-robe circuits mounted upon said cover; terminals for the lines leading from the generator mounted upon said cover; two incandescent-lamp sockets mounted upon said cover; a rheostat for the sweating-robe circuit connected to said cover; a line running from one of the generator-terminals through the rheostat to one of the switches; a second line connecting the switches together; a return-wire for the sweating-robe circuit connected to the other generator-terminal; a line running from this return-wire through one of the lamps to the opposite terminal from that to which the return-wire is connected; binding-posts connected to said cover; electrodes connected to said binding-posts; a line connecting one of said binding-posts to the rheostat; a line running from the other binding-post through the second lamp to the opposite generator-terminal from that to which the rheostat is connected; a second rheostat; and a line running through said second rheostat, and connected to the electrode-wires at points on the opposite sides of said binding-posts from the electrodes as required to partly short-circuit the electrodes, substantially as specified.

2. In a device of the class described, a generator-circuit; a rheostat through which the generator-circuit passes; sweating-robe circuits; switches in said sweating-robe circuits and connected to the generator-circuit; an electrode-circuit connected to the generator-circuit; a second rheostat connecting the electrode-circuit as required to partly short-circuit the electrodes; and a lamp incorporated into the electrode-circuit, substantially as specified.

3. In a device of the class described, a rheostat; a generator-circuit leading to the rheostat; an incandescent lamp; a line passing through the incandescent lamp, and short-circuiting the rheostat, substantially as specified.

4. In a device of the class described, a rheostat; a generator-circuit passing through the rheostat to the switches; sweating-robes connected to said switches; electrodes connected to said generator-circuit as required to throw part of the circuit through the electrodes when they are connected; a lamp incorporated into the electrode-circuit; and a rheostat for partly short-circuiting the electrode-circuit, substantially as specified.

In testimony whereof I affix my signature in presence of two witnesses.

ANDREW PHILLIPS.

Witnesses:
ALFRED A. EICKS,
JOHN D. RIPPEY.